US011465688B2

(12) United States Patent
Aizawa et al.

(10) Patent No.: US 11,465,688 B2
(45) Date of Patent: Oct. 11, 2022

(54) VEHICLE FRONT STRUCTURE

(71) Applicant: MAZDA MOTOR CORPORATION, Hiroshima (JP)

(72) Inventors: Makoto Aizawa, Aki-gun (JP); Tetsuo Nagata, Aki-gun (JP); Ryosuke Kawafune, Aki-gun (JP); Yuta Mishima, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 28 days.

(21) Appl. No.: 17/063,500

(22) Filed: Oct. 5, 2020

(65) Prior Publication Data

US 2021/0114668 A1     Apr. 22, 2021

(30) Foreign Application Priority Data

Oct. 18, 2019     (JP) .............................. JP2019-191294

(51) Int. Cl.
*B62D 21/15* (2006.01)
*B60R 19/18* (2006.01)
*B60R 19/12* (2006.01)
*B60R 21/34* (2011.01)

(52) U.S. Cl.
CPC ............ *B62D 21/155* (2013.01); *B60R 19/12* (2013.01); *B60R 19/18* (2013.01); *B60R 21/34* (2013.01); *B60R 2019/186* (2013.01); *B60R 2019/1886* (2013.01)

(58) Field of Classification Search
CPC ............ B62D 21/155; B60R 2019/186; B60R 2019/1886; B60R 19/18; B60R 21/34; B60R 19/12

USPC ........................................................ 296/187.1
See application file for complete search history.

(56) References Cited

U.S. PATENT DOCUMENTS

| 9,254,812 | B2 * | 2/2016 | Tashiro | .................. | B60R 21/34 |
| 2005/0046206 | A1 | 3/2005 | Ohno et al. | | |
| 2007/0182174 | A1 * | 8/2007 | Nakayama | .............. | B60R 19/52 |
| | | | | | 293/115 |

FOREIGN PATENT DOCUMENTS

| CN | 1579839 A | 2/2005 |
| JP | 2019-038497 A | 3/2019 |

* cited by examiner

*Primary Examiner* — D Glenn Dayoan
*Assistant Examiner* — Dana D Ivey
(74) *Attorney, Agent, or Firm* — Studebaker & Brackett PC (57) ABSTRACT

A vehicle front structure that reduces a shock load applied to immediately under a front grille by using a bumper beam as a support. A vehicle front structure includes a shock absorbing member at an interior of a bumper face on the side near an upper portion thereof which absorbs a load from the diagonally upper front side. The shock absorbing member is at the interior of the bumper face below a front grille, and includes a load receiving portion that receives a load, a locking portion locked to an upper end edge of a bumper beam located behind and below the load receiving portion, at the time of receding of the shock absorbing member, and a connecting portion connecting the load receiving portion and the locking portion. A deformation facilitating portion with respect to a load from the upper front side is thus configured at the connecting portion.

8 Claims, 8 Drawing Sheets

VEHICLE FRONT STRUCTURE

BACKGROUND

Technical Field

The present disclosure relates to a vehicle front structure including a shock absorbing member at an interior of a bumper face on the side near an upper portion thereof which absorbs a load from the diagonally upper front side.

Background Art

A structure of absorbing a load from the upper front side for protecting pedestrians is typically provided at an interior of a bumper face upper located above a front grille, as disclosed in Japanese Patent Laid-Open No. 2019-38497. Although not disclosed in Japanese Patent Laid-Open No. 2019-38497, there is a demand for using other portions as much as possible for load absorption so that an amount of absorption of a shock load from the upper front side for protecting pedestrians is increased.

SUMMARY

Thus, the present disclosure provides a vehicle front structure that is capable of reducing a shock load applied to immediately under a front grille by using a bumper beam as a support.

A vehicle front structure according to the present disclosure is a vehicle front structure including a shock absorbing member at an interior of a bumper face on a side near an upper portion of the bumper face, in which the shock absorbing member absorbs a load from a diagonally upper front side. The shock absorbing member is disposed at the interior of the bumper face below a front grille. The shock absorbing member includes a load receiving portion configured to receive a load; a locking portion configured to be locked to an upper end edge of a bumper beam located behind and below the load receiving portion, at a time of receding of the shock absorbing member; and a connecting portion connecting the load receiving portion and the locking portion. Thus, a deformation facilitating portion with respect to a load from an upper front side is formed at the connecting portion.

The above-described deformation facilitating portion may be a bent portion, or a slit or an elongated opening. According to the configuration, at the time of input of a shock load, the locking portion is locked to the upper end edge of the bumper beam, so that a shock load applied to immediately under the front grille can be absorbed by using the bumper beam as a support. Specifically, at the time of input of a shock load, the locking portion is locked to the upper end edge of the bumper beam, and the connecting portion is deformed by using the deformation facilitating portion as a starting point, so that a shock load is absorbed.

In an embodiment of the present disclosure, the deformation facilitating portion is configured by a plurality of bent portions formed to be spaced apart from each other in a front-rear direction in a middle of the connecting portion. According to the configuration, at the time of input of a shock load, a certain bracing load is generated at the connecting portion, and while deformation of the connecting portion is facilitated by the bent portions, a shock load can be kept to be received within a load reference value. Incidentally, when the bent portions (deformation facilitating portion) are not present, the connecting portion is not bent and deformed, and thus the load reference value is exceeded.

In an embodiment of the present disclosure, a concave-convex shaped portion which is astride the bent portions in the front-rear direction and concave and convex in a vehicle width direction is formed at the connecting portion. According to the configuration, rigidity of the connecting portion can be enhanced by the concave-convex shaped portion, so that an amount of shock absorption at the time of bending deformation can be increased.

In an embodiment of the present disclosure, a concave-convex shaped portion which is concave and convex in a vehicle width direction is formed at the load receiving portion. According to the configuration, rigidity of the load receiving portion can be enhanced at the above-described concave-convex shaped portion.

In an embodiment of the present disclosure, a separating portion is formed at a vehicle-width-direction center of the connecting portion, a mounting piece portion extending downward from the connecting portion via the separating portion is formed, and the concave-convex shaped portion is formed at the connecting portion adjacent to the separating portion. According to the configuration, rigidity reduction by the separating portion can be reinforced by the above-described concave-convex shaped portion.

The present disclosure provides an effect that a shock load applied to immediately under the front grille can be reduced by using the bumper beam as the support.

DETAILED DESCRIPTION

As discussed below, reducing a shock load applied to immediately under a front grille by using a bumper beam as a support is achieved by a configuration of a vehicle front structure including a shock absorbing member at an interior of a bumper face on the side near an upper portion thereof which absorbs a load from the diagonally upper front side. The shock absorbing member is disposed at the interior of the bumper face below the front grille. The shock absorbing member includes a load receiving portion configured to receive a load; a locking portion configured to be locked to an upper end edge of the bumper beam located behind and below the load receiving portion, at the time of receding of the shock absorbing member; and a connecting portion connecting the load receiving portion and the locking portion. A deformation facilitating portion with respect to a load from the upper front side is thus formed at the connecting portion.

EMBODIMENTS

Figure 1:
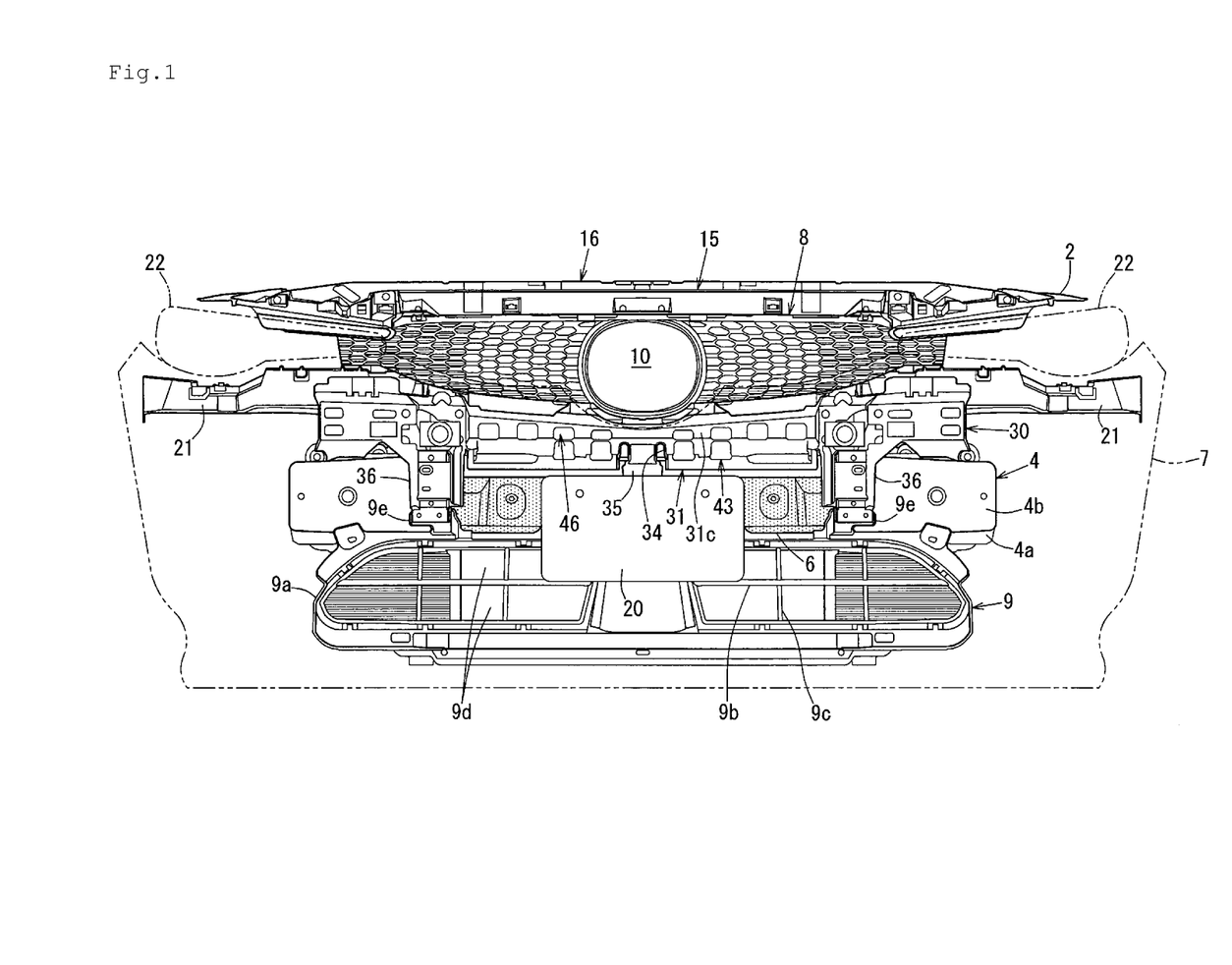
FIG. 1 is a front view showing a vehicle front structure of the present disclosure.
Figure 2:
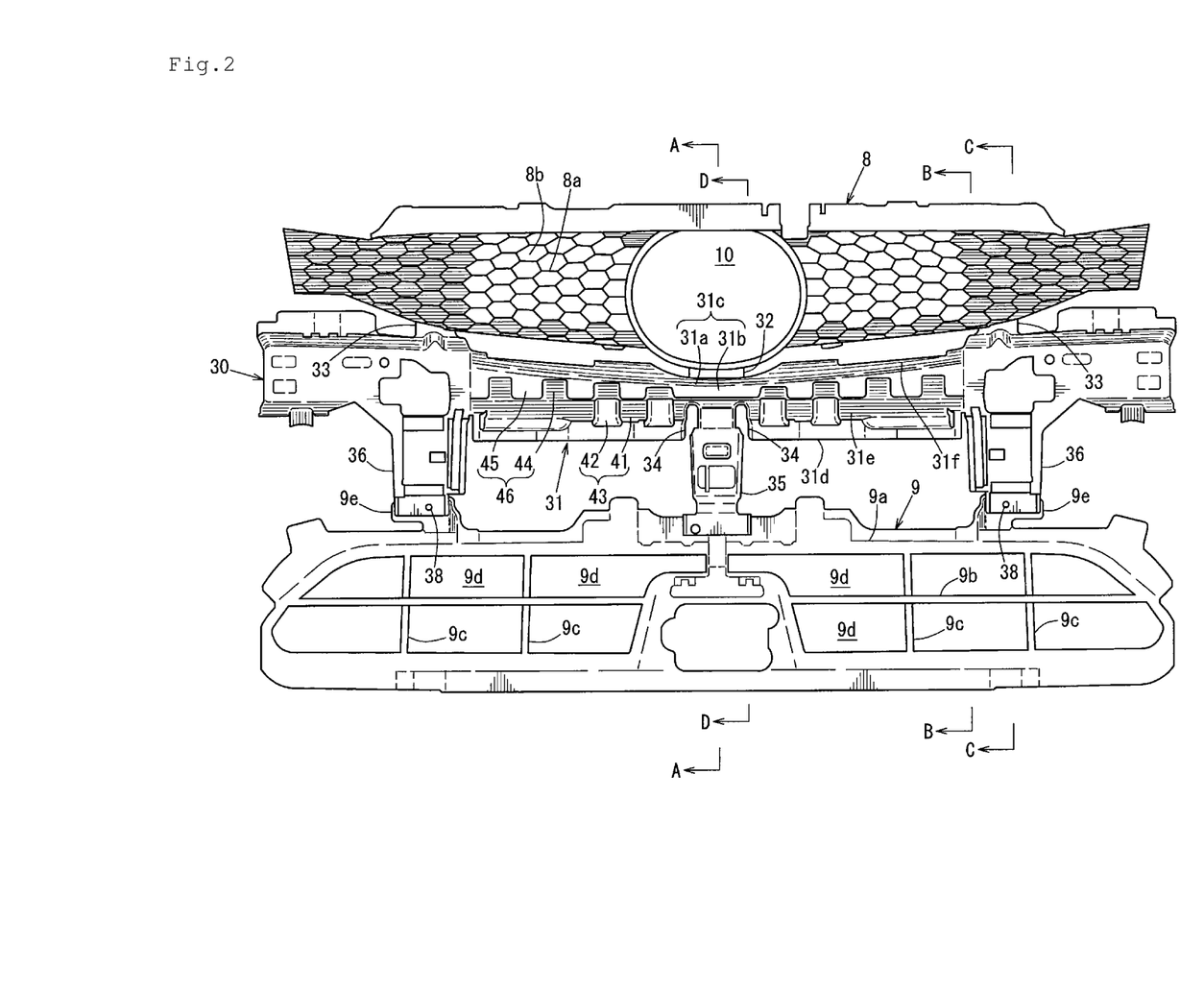
FIG. 2 is a front view showing a front grille, a shock absorbing member, and a lower-side grille.

An embodiment of the present disclosure will be described in detail based on the following drawings. The drawings show a vehicle front structure, in which FIG. 1 is a front view showing the vehicle front structure and FIG. 2 is a front view showing a front grille, a shock absorbing member, and a lower-side grille. Furthermore, FIG. 3 is an arrow cross-sectional view at a position corresponding to line A-A in FIG. 2, FIG. 4 is an arrow cross-sectional view at a position corresponding to line B-B in FIG. 2, FIG. 5 is an arrow cross-sectional view at a position corresponding to line C-C in FIG. 2, and FIG. 6 is an arrow cross-sectional view at a position corresponding to line D-D in FIG. 2.

Figure 3:
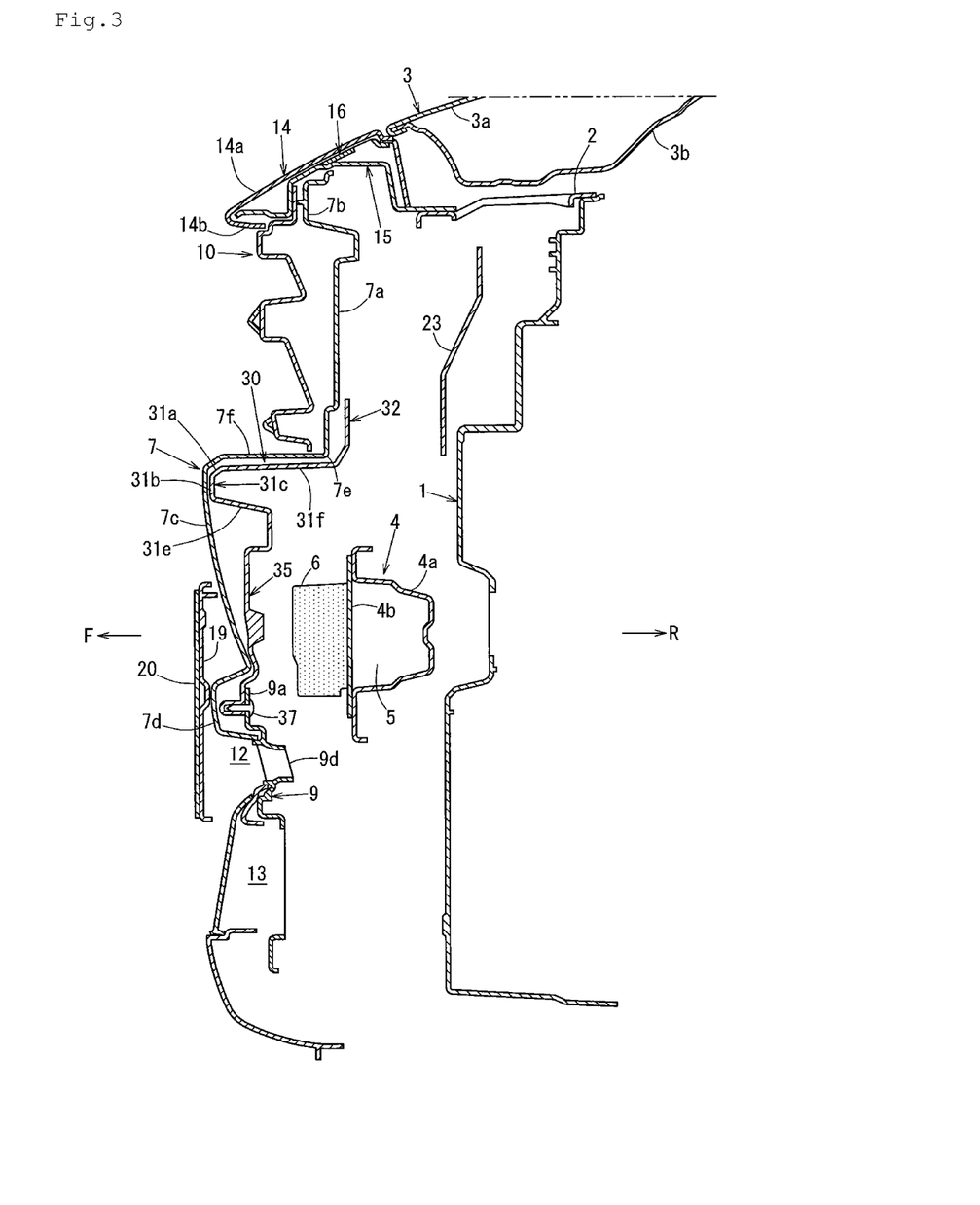
FIG. 3 is an arrow cross-sectional view at a position corresponding to line A-A in FIG. 2.

In FIG. 3, an upper portion of a radiator shroud 1 provided at a front portion of an engine compartment is mounted on a front portion of an apron reinforcement via a shroud upper 2 extending in the vehicle width direction. As shown in FIGS. 3, 4, and 5, the upper side of the engine compartment is covered by a bonnet 3 so as to be openable and closable. In this embodiment, the bonnet 3 uses a rear end portion thereof as a hinge and is configured so that the front end side opens and closes.

Figure 4:
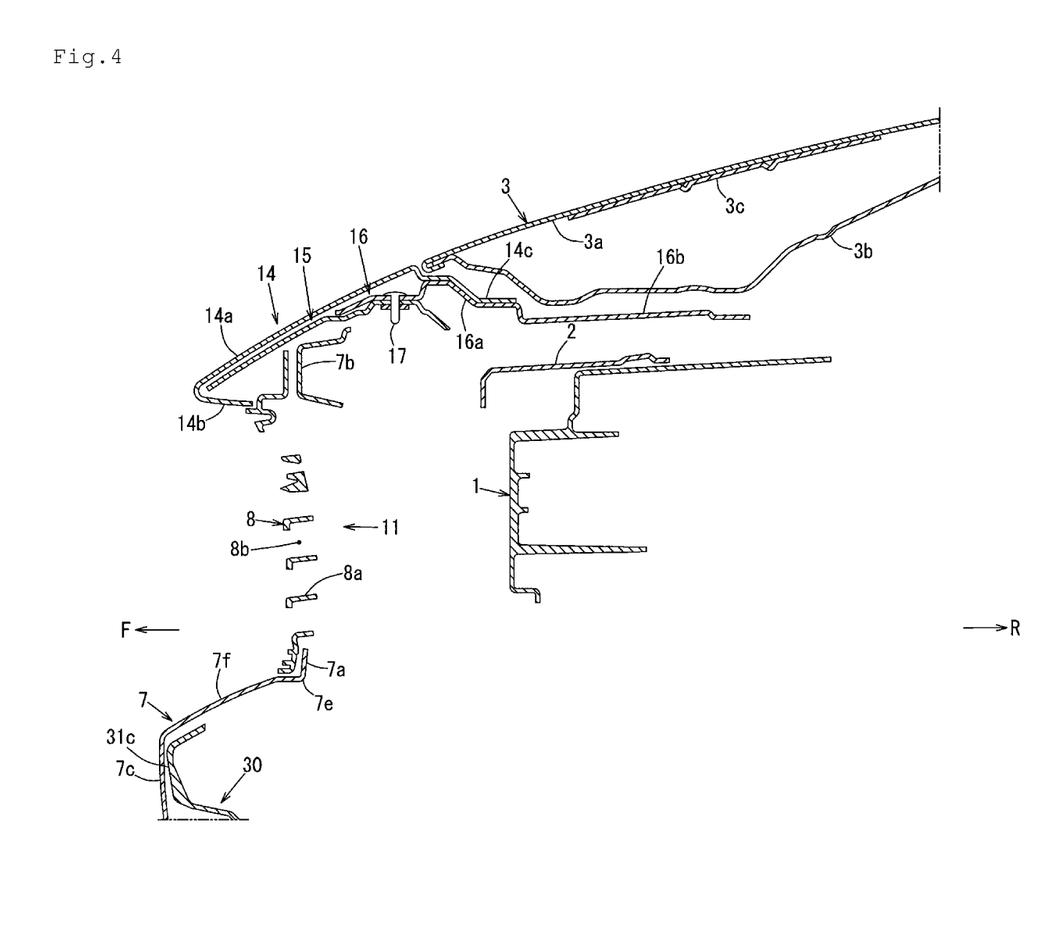
FIG. 4 is an arrow cross-sectional view at a position corresponding to line B-B in FIG. 2.
Figure 5:
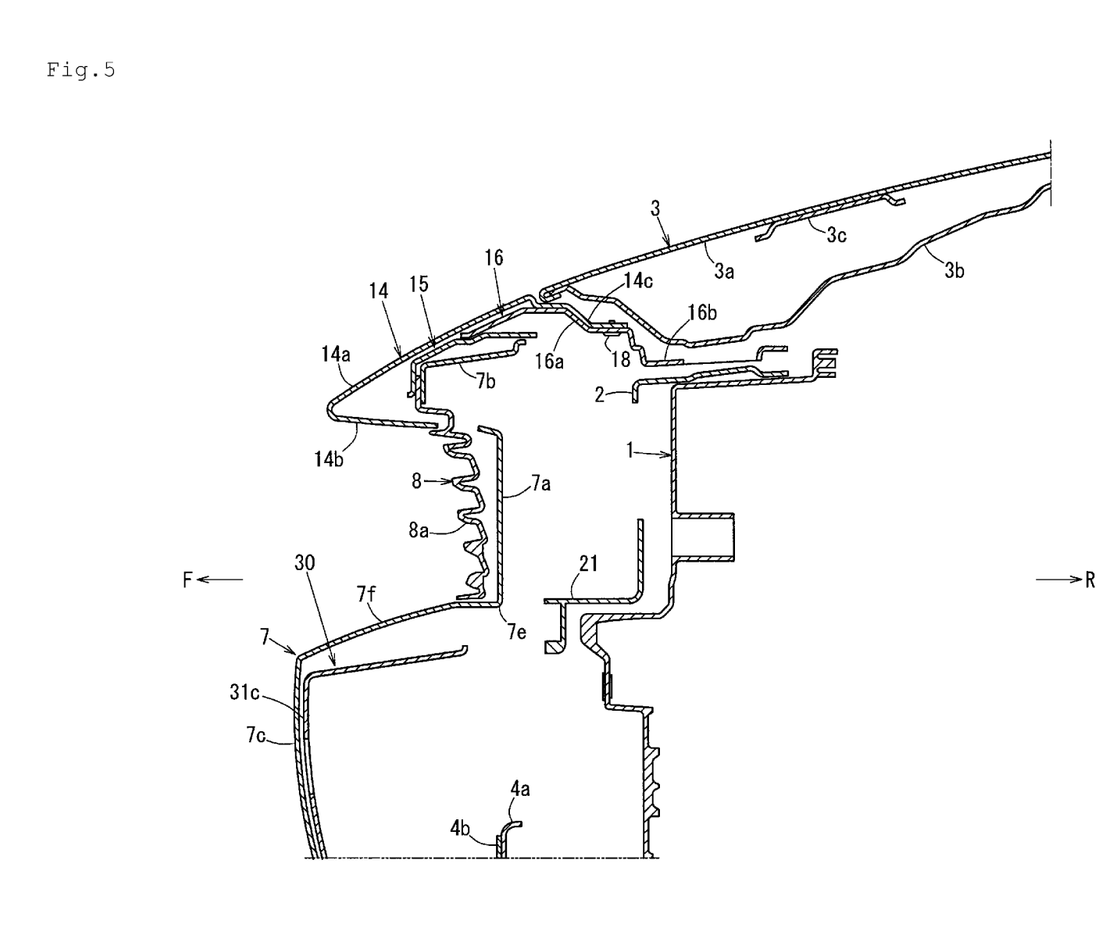
FIG. 5 is an arrow cross-sectional view at a position corresponding to line C-C in FIG. 2.
Figure 6:
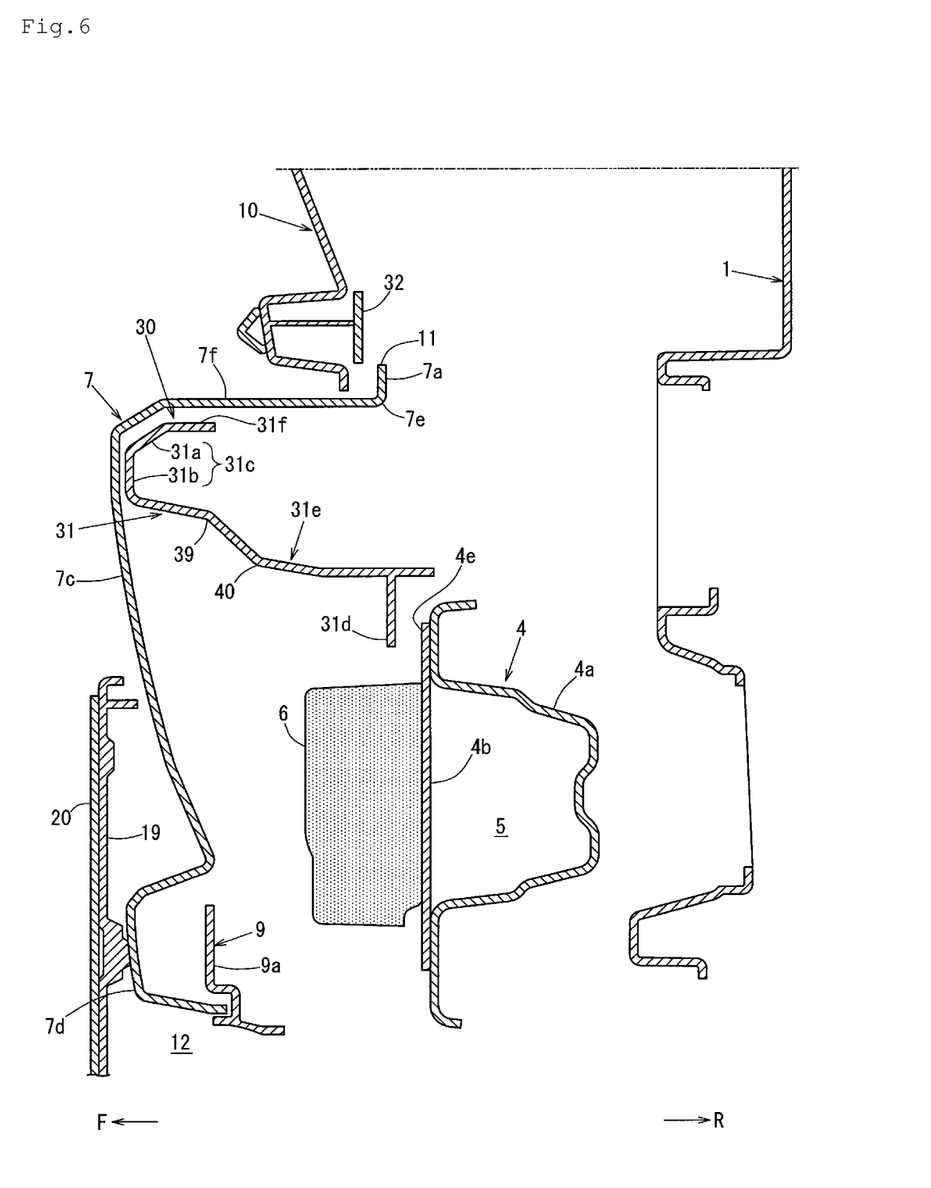
FIG. 6 is an arrow cross-sectional view at a position corresponding to line D-D in FIG. 2.

The bonnet 3 is configured by joining a bonnet outer panel 3a and a bonnet inner panel 3b by hemming for integration, and as shown in FIGS. 4 and 5, a bonnet reinforcement 3c is bonded and fixed on the bottom face side of the bonnet outer panel 3a.

On each of both left and right sides of the engine compartment and radiator shroud 1 in the vehicle width direction, there is provided a front side frame extending in the vehicle front-rear direction. On a front end of the front side frame, a crash can is mounted via a set plate.

Between front ends of a pair of the left and right crash cans, there is provided a bumper beam 4 extending in the vehicle width direction (see FIGS. 3 and 6). As shown in FIGS. 3 and 6, this bumper beam 4 extends in the vehicle width direction on the front side of the radiator shroud 1. Furthermore, the bumper beam 4 includes a bumper beam closed cross-section 5 which bonds and fixes a bumper beam body 4a and a closing plate 4b and extends in the vehicle width direction.

As shown in FIGS. 3 and 6, at a front face of the closing plate 4b of the bumper beam 4, a lower shock absorbing member 6 made of styrene foam formed of polyethylene, polystyrene, or the like is disposed. This lower shock absorbing member 6 is a shock absorbing member, a so-called EA foam, which continuously extends in the vehicle width direction within a range between the left and right crash cans.

As shown in FIGS. 3 to 6, there is provided a bumper face 7 constituting a vehicle front face. This bumper face 7 is formed by integrating a receding portion 7a located behind a front grille 8, an upper end portion 7b located on the upper side of the receding portion 7a, an intermediate portion 7c located on the front side with respect to the front grille 8 and the lower shock absorbing member 6, and a lower piece portion 7d located on the front side with respect to a lower-side grille 9.

As shown in FIGS. 1 to 3, in a vehicle-width-direction center of the front grille 8, an emblem 10 is provided at a front portion of the front grille 8. As shown in FIGS. 4 and 6, an outside air inlet 11 is formed at the receding portion 7a of the bumper face 7 facing to the front grille 8 in the front-rear direction except for the vehicle-width-direction center of the front grille 8 provided with the emblem 10 and both left and right sides of the front grille 8 in the vehicle width direction.

Furthermore, as shown in FIG. 3, also at the lower piece portion 7d of the bumper face 7 facing to the lower-side grille 9 in the front-rear direction, outside air inlets 12 and 13 are formed in an opening manner in the up-down direction. As shown in FIGS. 2, 4, and 5, in the above-described front grille 8, cells 8a in a hexagonal frame shape as viewed in vehicle front are vertically and horizontally disposed, forming openings 8b for introducing outside air.

As shown in FIG. 2, in the lower-side grille 9, an outer frame 9a in a ring shape elongated in the vehicle width direction is provided with a horizontal crosspiece 9b and a plurality of vertical crosspieces 9c which are spaced apart from each other, forming an opening 9d for introducing outside air. As shown in FIGS. 3, 4, and 5, on the upper side of the front grille 8, there is provided a bumper face upper 14 extending in the vehicle width direction.

As shown in FIGS. 4 and 5, this bumper face upper 14 includes a top face portion 14a inclined in a front-low rear-high shape so as to be, in the front-rear direction, continuous with a top face of the bonnet outer panel 3a and a bottom face portion 14b formed to be folded from a front end of this top face portion 14a toward the front side of an upper portion of the front grille 8. Furthermore, the bumper face upper 14 includes a rear extending portion 14c extending further rearward from a rear end of the top face portion 14a.

As shown in FIGS. 3 to 5, at an interior of the top face portion 14a of the bumper face upper 14, namely, at a lower portion thereof, there is provided a front-side shock absorbing member 15 that absorbs a load from the diagonally upper front side. This front-side shock absorbing member 15 is formed of fiber reinforced plastic.

As shown in FIGS. 3 to 5, at an immediately lower portion of the top face portion 14a of the bumper face upper 14 and on the upper side of a rear portion of the front-side shock absorbing member 15, there is provided a rear-side shock absorbing member 16 that absorbs a load from the diagonally upper front side. This rear-side shock absorbing member 16 is formed of synthetic resin such as polypropylene.

Specifically, the rear-side shock absorbing member 16 is formed by integrating a front portion 16a located at the immediately lower portion of the top face portion 14a of the bumper face upper 14 and at an immediately lower portion of the rear extending portion 14c of the bumper face upper 14, and a rear portion 16b extending rearward below the bonnet inner panel 3b from a rear end of this front portion 16a up to above the shroud upper 2. As shown in FIG. 4, an intermediate portion of the front portion 16a of the above-described rear-side shock absorbing member 16 in the front-rear direction is mounted on the front-side shock absorbing member 15 by using a mounting member 17.

As shown in FIG. 5, a rear end portion of the front portion 16a of the rear-side shock absorbing member 16 is mounted on the rear extending portion 14c of the bumper face upper 14 by using a mounting member 18. As shown in FIGS. 4 and 5, the front-side shock absorbing member 15 and the rear-side shock absorbing member 16 are provided at an interior of the bumper face upper 14, wherein the front-side shock absorbing member 15 having relatively high rigidity is disposed on the front side and the rear-side shock absorbing member 16 having relatively low rigidity is disposed on the rear side.

Meanwhile, as shown in FIGS. 1, 3, and 6, a license plate 20 is provided at a vehicle-width-direction center of the intermediate portion 7c of the bumper face 7 via a base member 19. Furthermore, in FIGS. 1 and 5, reference numeral 21 denotes a lamp bracket supporting a headlamp 22. Furthermore, in FIG. 3, reference numeral 23 denotes a center stay connecting the shroud upper 2 and the bumper beam 4. As shown in FIGS. 3 to 6, the above-described bumper face 7 includes a front extending portion 7f substantially horizontally extending forward from a lower end 7e of the receding portion 7a.

As shown in the drawings, at an interior of the bumper face 7 on the side near an upper portion thereof, specifically, below the front extending portion 7f and behind the intermediate portion 7c, an intermediate shock absorbing member 30 (hereinafter simply abbreviated as the "shock absorbing member 30") is included which absorbs a load from the diagonally upper front side. This shock absorbing member 30 is disposed at the interior of the above-described bumper face 7 below the front grille 8.

Furthermore, the shock absorbing member 30 is formed of synthetic resin such as polypropylene. This shock absorbing member 30 and the above-described front-side shock absorbing member 15 are formed to have high rigidity in the up-down direction with respect to rigidity of the lower shock absorbing member 6 in the up-down direction. Here, as shown in FIG. 1, the above-described front-side shock absorbing member 15 is disposed between the left and right headlamps 22, while the shock absorbing member 30 is disposed up to a position below the left and right headlamps 22.

Figure 7:
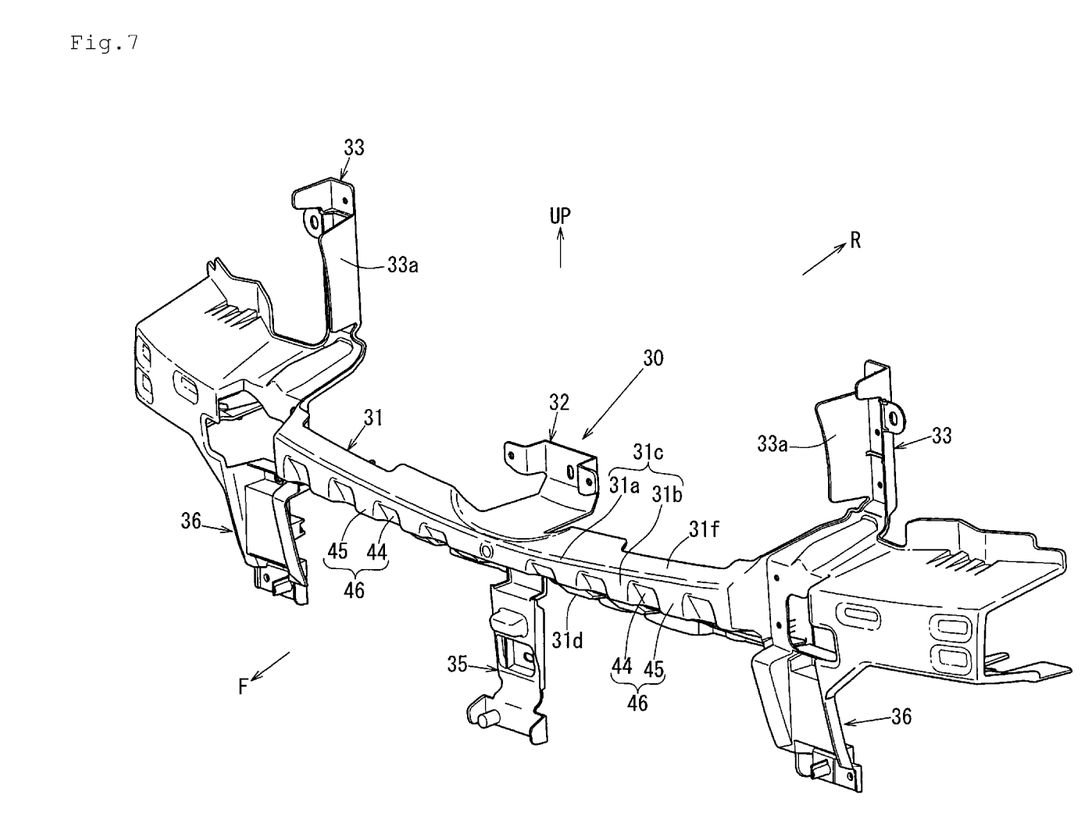
FIG. 7 is a perspective view of the shock absorbing member.
Figure 8:
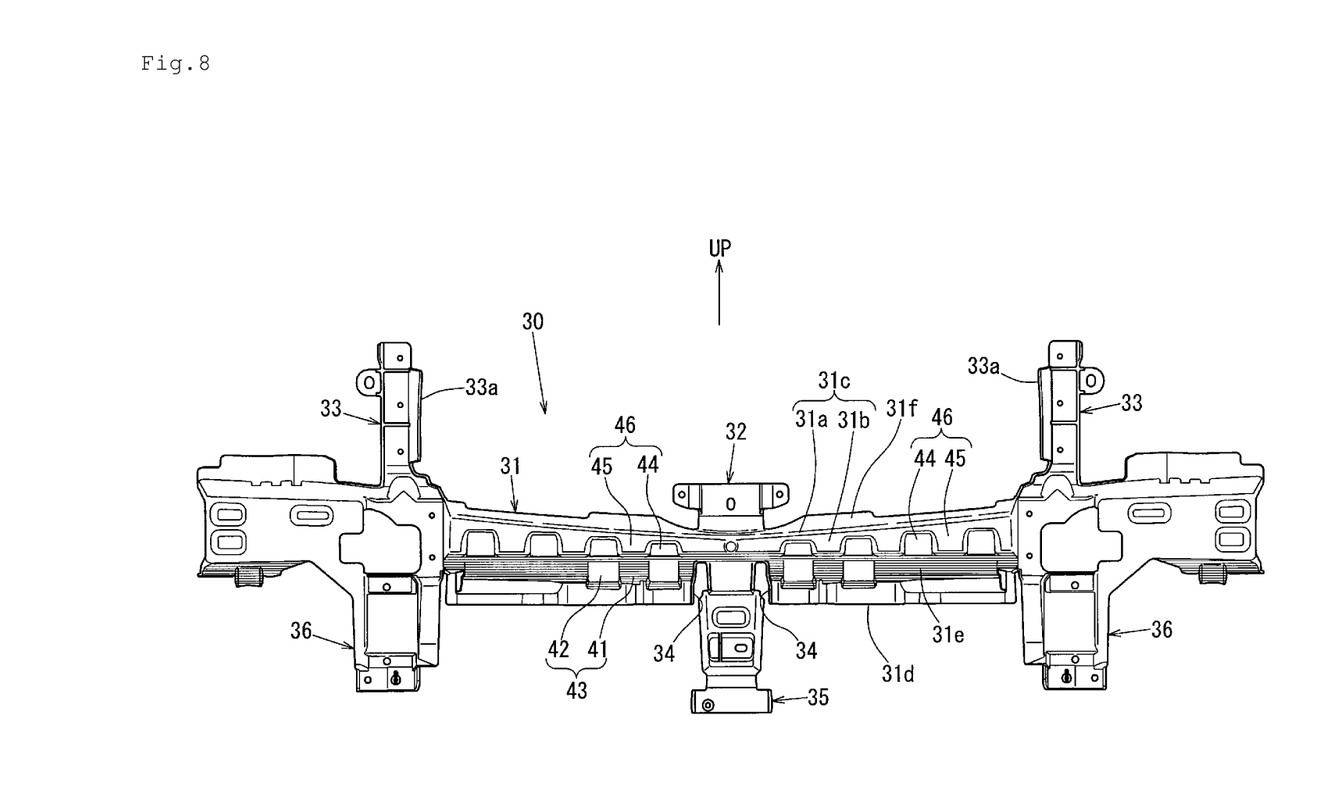
FIG. 8 is a front view of the shock absorbing member.

FIG. 7 is a perspective view of the shock absorbing member 30, and FIG. 8 is a front view of the shock absorbing member 30. This shock absorbing member 30 includes a body 31 having a substantially recess-shaped cross-section in which the vehicle rear side is open which extends in the vehicle width direction up to a position below the left and right headlamps 22 (see FIGS. 1 and 2).

As shown in FIGS. 7 and 8, the body 31 of the shock absorbing member 30 is, at a vehicle-width-direction center thereof on the upper side, formed integrally with an upper-side mounting piece portion 32. Furthermore, the body 31 is, at both left and right side portions thereof in the vehicle width direction on the upper side, formed integrally with side mounting piece portions 33.

As shown in FIGS. 7 and 8, at the vehicle-width-direction center of the body 31 on the lower side, a separating portion 34 is formed, and the vehicle-width-direction center of the body 31 on the lower side is formed integrally with a lower-side mounting piece portion 35 extending downward from the body 31 via the separating portion 34. Furthermore, the body 31 is, at both left and right side portions thereof in the vehicle width direction on the lower side, formed integrally with side mounting piece portions 36.

The above-described upper-side mounting piece portion 32 and lower-side mounting piece portion 35 are provided at the same position in the vehicle width direction, and furthermore, the side mounting piece portion 33 on the upper side and the side mounting piece portion 36 on the lower side are provided at the same position in the vehicle width direction. As shown in FIG. 3, the upper-side mounting piece portion 32 is mounted on a lower portion of the receding portion 7a of the bumper face 7, and a lower portion of the lower-side mounting piece portion 35 is mounted on an upper piece of the outer frame 9a of the lower-side grille 9 by using a mounting member 37.

The side mounting piece portion 33 on the upper side is mounted on a seal rubber sealing between a rear face of a vehicle-width-direction side portion of the front grille 8 and a front face of a vehicle-width-direction side portion of the radiator shroud 1. As shown in FIGS. 7 and 8, on the vehicle-width-direction inner side of the side mounting piece portion 33 on the upper side, a seal plate portion 33a extending in the up-down direction is formed integrally therewith, and a pair of the left and right seal plate portions 33a are configured to guide traveling air introduced from the front grille 8 to the radiator shroud 1.

As shown in FIG. 2, at a position of the outer frame 9a of the lower-side grille 9 which corresponds to the side mounting piece portion 36, a mounting piece 9e is formed integrally therewith, and the side mounting piece portion 36 on the lower side is connected and fixed to this mounting piece 9e by using a mounting member 38. As shown in FIG. 6, the body 31 of the shock absorbing member 30 includes a load receiving portion 31c including a tapered face 31a and a raised wall face 31b, a locking portion 31d, and a connecting portion 31e.

An upper end of the raised wall face 31b extending in the up-down direction is formed integrally with the tapered face 31a extending upward and rearward in an inclined shape, and a rear end of the tapered face 31a is formed integrally with an upper piece portion 31f extending substantially horizontally rearward from the rear end. The load receiving portion 31c including the above-described tapered face 31a and raised wall face 31b receives a load.

The above-described locking portion 31d is locked to an upper end edge 4e of the bumper beam 4 located behind and below the load receiving portion 31c, at the time of receding of the shock absorbing member 30. Furthermore, the above-described connecting portion 31e connects a lower end of the load receiving portion 31c and an upper end of the locking portion 31d in the front-rear direction. In this embodiment, the locking portion 31d extends downward in a right-angled shape from the connecting portion 31e.

A cross-section structure of the body 31 including the elements 31a to 31f shown in FIG. 6 is substantially equally formed between the left and right side mounting piece portions 33 and between the left and right side mounting piece portions 36 except for a portion where the separating portion 34 is formed. As shown in FIG. 6, bent portions 39 and 40 as a deformation facilitating portion with respect to a load from the upper front side are formed at the above-described connecting portion 31e.

When a shock load from the diagonally upper front side is input to the load receiving portion 31c by forming the above-described locking portion 31d and bent portions 39 and 40, the locking portion 31d recedes and is locked to the upper end edge 4e of the bumper beam 4, and a shock load applied to immediately under the front grille is absorbed by using the bumper beam 4 as a support. At this time, the connecting portion 31e is deformed by using the bent portions 39 and 40, which are the deformation facilitating portion, as starting points, so that a shock load can be absorbed.

As shown in FIG. 6, the above-described deformation facilitating portion is configured by a plurality of the bent portions 39 and 40 formed to be spaced apart from each other in the vehicle front-rear direction in the middle of the connecting portion 31e. As shown in FIG. 6, in this embodiment, the bent portion 39 on the front side has an outward bending structure, and the bent portion 40 on the rear side has an inward bending structure.

Thereby, at the time of input of a shock load, a certain bracing load is generated at the connecting portion 31e, and while deformation of the connecting portion 31e is facilitated by the front and rear bent portions 39 and 40, a shock load can be kept to be received within a load reference value. Incidentally, when the bent portions 39 and 40 are not present, the connecting portion 31e is not bent and deformed, and thus the load reference value is exceeded.

As shown in FIGS. 2 and 8, at the above-described connecting portion 31e, a recess 41 and a projection 42 astride the front and rear bent portions 39 and 40 in the vehicle front-rear direction are alternately formed in the vehicle width direction, forming a concave-convex shaped portion 43 which is concave and convex in the vehicle width direction. By this concave-convex shaped portion 43, rigidity of the connecting portion 31e is enhanced, and an amount of shock absorption at the time of bending deformation can be increased.

As shown in FIGS. 2, 7, and 8, at the raised wall face 31b of the above-described load receiving portion 31c, a recess 44 and a projection 45 are alternately formed in the vehicle width direction, forming a concave-convex shaped portion 46 which is concave and convex in the vehicle width direction. In this embodiment, the projection 45 is formed to be flush with a front face portion of the raised wall face 31b, and the recess 44 is formed so as to be recessed rearward with respect to the raised wall face 31b. By the above-described concave-convex shaped portion 46, rigidity of the load receiving portion 31c can be enhanced.

Furthermore, as shown in FIGS. 2, 7, and 8, the separating portion 34 as a non-concave-convex shaped portion is formed at a vehicle-width-direction center of the above-described connecting portion 31e. Then, the lower-side mounting piece portion 35 extending downward from the connecting portion 31e via the separating portion 34 is formed, and the above-described concave-convex shaped portion 43 is formed at the connecting portion 31e adjacent to the separating portion 34. Thereby, rigidity reduction by the separating portion 34 can be reinforced by the above-described concave-convex shaped portion 43. In the drawings, arrow F indicates the vehicle front side; arrow R, the vehicle rear side; arrow UP, the vehicle upper side.

Thus, the vehicle front structure of the embodiment is a vehicle front structure including the shock absorbing member 30 at the interior of the bumper face 7 on the side near the upper portion thereof which absorbs a load from the diagonally upper front side, the shock absorbing member 30 is disposed at the interior of the bumper face 7 below the front grille 8, and the shock absorbing member 30 includes the load receiving portion 31c that receives a load; the locking portion 31d locked to the upper end edge 4e of the bumper beam 4 located behind and below the load receiving portion 31c, at the time of receding of the shock absorbing member 30; and the connecting portion 31e connecting the load receiving portion 31c and the locking portion 31d, wherein the deformation facilitating portion (see the bent portions 39 and 40) with respect to a load from the upper front side is formed at the connecting portion 31e (see FIGS. 2 and 6).

According to this configuration, at the time of input of a shock load, the locking portion 31d is locked to the upper end edge 4e of the bumper beam 4, so that a shock load applied to immediately under the front grille 8 can be absorbed by using the bumper beam 4 as a support. Specifically, at the time of input of a shock load, the locking portion 31d is locked to the upper end edge 4e of the bumper beam 4, and the connecting portion 31e is deformed by using the deformation facilitating portion (bent portions 39 and 40) as the starting point, so that a shock load is absorbed.

Furthermore, in an embodiment of the present disclosure, the deformation facilitating portion is configured by the plurality of bent portions 39 and 40 formed to be spaced apart from each other in the front-rear direction in the middle of the connecting portion 31e (see FIG. 6). According to this configuration, at the time of input of a shock load, a certain bracing load is generated at the connecting portion 31e, and while deformation of the connecting portion 31e is facilitated by the bent portions 39 and 40, a shock load can be kept to be received within a load reference value. Incidentally, when the bent portions 39 and 40 (deformation facilitating portion) are not present, the connecting portion 31e is not bent and deformed, and thus the load reference value is exceeded.

Furthermore, in an embodiment of the present disclosure, the concave-convex shaped portion 43 which is astride the bent portions 39 and 40 in the front-rear direction and concave and convex in the vehicle width direction is formed at the connecting portion 31e (see FIGS. 2 and 8). According to this configuration, the rigidity of the connecting portion 31e can be enhanced by the concave-convex shaped portion 43, so that the amount of shock absorption at the time of bending deformation can be increased.

Furthermore, in an embodiment of the present disclosure, the concave-convex shaped portion 46 which is concave and convex in the vehicle width direction is formed at the load receiving portion 31c (see FIGS. 2, 7, and 8). According to this configuration, the rigidity of the load receiving portion 31c can be enhanced at the above-described concave-convex shaped portion 46.

In addition, in an embodiment of the present disclosure, the separating portion 34 is formed at the vehicle-width-direction center of the connecting portion 31e, the mounting piece portion (see the lower-side mounting piece portion 35) extending downward from the connecting portion 31e via the separating portion 34 is formed, and the concave-convex shaped portion 43 is formed at the connecting portion 31e adjacent to the separating portion 34 (see FIGS. 2, 7, and 8). According to this configuration, the rigidity reduction by the separating portion 34 can be reinforced by the above-described concave-convex shaped portion 43.

Although in a correspondence between the configuration of the present disclosure and the above-described embodiment, the deformation facilitating portion of the present disclosure corresponds to the bent portions 39 and 40 of the embodiment, and hereinafter, similarly, the mounting piece portion corresponds to the lower-side mounting piece portion 35, the present disclosure is not limited to only the configuration of the above-described embodiment. For example, the above-described deformation facilitating portion may be a slit or an elongated opening, instead of the bent portions 39 and 40.

As explained above, the present disclosure is useful for a vehicle front structure including a shock absorbing member at an interior of a bumper face on the side near an upper portion thereof which absorbs a load from the diagonally upper front side.

What is claimed is:
1. A vehicle front structure comprising:
a shock absorbing member at an interior of a bumper face on a side near an upper portion of the bumper face, the shock absorbing member being configured to absorb a load from a diagonally upper front side, the shock absorbing member being disposed at the interior of the bumper face below a front grille,
the shock absorbing member comprising:
a load receiving portion configured to receive a load;
a locking portion configured to be locked to an upper end edge of a bumper beam located behind and below the load receiving portion, at a time of receding of the shock absorbing member; and
a connecting portion connecting the load receiving portion and the locking portion, wherein a deforma- tion facilitating portion with respect to a load from an upper front side is configured at the connecting portion;

wherein a concave-convex shaped portion which is concave and convex in a vehicle width direction is configured at the load receiving portion.

2. The vehicle front structure according to claim 1, wherein the deformation facilitating portion is configured by a plurality of bent portions spaced apart from each other in a front-rear direction in a middle of the connecting portion.

3. The vehicle front structure according to claim 2, wherein a concave-convex shaped portion which is astride the bent portions in the front-rear direction and concave and convex in the vehicle width direction is configured at the connecting portion.

4. The vehicle front structure according to claim 3, wherein the load receiving portion includes a raised wall face, and the concave-convex shaped portion is configured in the vehicle width direction by a recess and a projection alternatively configured at the raised wall face in the vehicle width direction, and the projection is flush with a front face portion of the raised wall face, and the recess is recessed rearward with respect to the raised wall face.

5. The vehicle front structure according to claim 3, wherein a separating portion is configured at a vehicle-width-direction center of the connecting portion, a mounting piece portion extending downward from the connecting portion via the separating portion is configured, and the concave-convex shaped portion is configured at the connecting portion adjacent to the separating portion.

6. The vehicle front structure according to claim 2, wherein the load receiving portion includes a raised wall face, and the concave-convex shaped portion is configured in the vehicle width direction by a recess and a projection alternatively configured at the raised wall face in the vehicle width direction, and the projection is flush with a front face portion of the raised wall face, and the recess is recessed rearward with respect to the raised wall face.

7. The vehicle front structure according to claim 1, wherein the load receiving portion includes a raised wall face, and the concave-convex shaped portion is configured in the vehicle width direction by a recess and a projection alternatively configured at the raised wall face in the vehicle width direction, and the projection is flush with a front face portion of the raised wall face, and the recess is recessed rearward with respect to the raised wall face.

8. A vehicle front structure comprising:

a shock absorbing member at an interior of a bumper face on a side near an upper portion of the bumper face, the shock absorbing member being configured to absorb a load from a diagonally upper front side, the shock absorbing member being disposed at the interior of the bumper face below a front grille, the shock absorbing member comprising:

a load receiving portion configured to receive a load;

a locking portion configured to be locked to an upper end edge of a bumper beam located behind and below the load receiving portion at a time of receding of the shock absorbing member together with the locking portion; and a connecting portion connecting the load receiving portion and the locking portion;

wherein a deformation facilitating portion with respect to a load from an upper front side is configured at the connecting portion; and the load receiving portion, the locking portion, and the connecting portion extend in a vehicle width direction between left and right side mounting piece portions and a center of the shock absorbing member.

* * * * *